United States Patent
Kim et al.

(10) Patent No.: US 10,132,686 B1
(45) Date of Patent: Nov. 20, 2018

(54) METHOD FOR SNAPSHOT INTERFEROMETRIC SPECTROMETRY

(71) Applicants: Industrial Cooperation Foundation Chonbuk National University, Jeollabuk-do (KR); Board of Regents, The University of Texas System, Austin, TX (US)

(72) Inventors: Daesuk Kim, Jeonju (KR); Robert Magnusson, Arlington, TX (US)

(73) Assignees: Industrial Cooperation Foundation Chonbuk National University, Jeollabuk-do (KR); Board of Regents, The University of Texas System, Austin, TX (US)

( * ) Notice: Subject to any disclaimer, the term of this patent is extended or adjusted under 35 U.S.C. 154(b) by 78 days.

(21) Appl. No.: 15/262,158

(22) Filed: Sep. 12, 2016

Related U.S. Application Data

(60) Provisional application No. 62/217,245, filed on Sep. 11, 2015.

(51) Int. Cl.
*G01J 3/453* (2006.01)
*G01J 3/02* (2006.01)

(52) U.S. Cl.
CPC .......... *G01J 3/4531* (2013.01); *G01J 3/0208* (2013.01); *G01J 3/0221* (2013.01); *G01J 3/0224* (2013.01); *G01J 2003/4538* (2013.01)

(58) Field of Classification Search
None
See application file for complete search history.

(56) References Cited

U.S. PATENT DOCUMENTS

| | | | |
|---|---|---|---|
| 6,249,350 B1 * | 6/2001 | Dultz | G01J 3/02 356/451 |
| 7,023,546 B1 | 4/2006 | McMillan | |
| 2009/0109442 A1 * | 4/2009 | Felix | G01J 3/02 356/491 |
| 2009/0206263 A1 * | 8/2009 | Rahman | G01J 3/02 250/341.1 |
| 2012/0176622 A1 * | 7/2012 | Kudenov | G01J 4/04 356/491 |

(Continued)

OTHER PUBLICATIONS

Daesuk Kim, Snapshot phase sensitive scatterometry based on double-channel spectral carrier frequency concept, Nov. 8, 2011, Optics Express, vol. 19, No. 24, pp. 1-10.*

(Continued)

*Primary Examiner* — Michael P LaPage
(74) *Attorney, Agent, or Firm* — Thomas | Horstemeyer, LLP

(57) ABSTRACT

A spectroscopic device is disclosed. The spectroscopic device can include a beam collimation structure with a white light source. The beam collimation structure can also include a lens configured to generate a collimated light beam. The spectroscopic device can also include a polarization modulation structure. The polarization modulation structure can convert the collimated light beam into a common path light beam. The common path light beam can include a delayed component and a polarized component. The spectroscopic device can include a dual spectrum sensing structure. The dual spectrum sensing structure can sense a normalized spectral Stokes vector in real time speed.

8 Claims, 9 Drawing Sheets

(56) References Cited

U.S. PATENT DOCUMENTS

2013/0215422 A1* 8/2013 Kimura ............... G01J 3/45
356/301
2015/0062586 A1* 3/2015 Zhu .................... G01J 3/45
356/453

OTHER PUBLICATIONS

Daesuk Kim, Stokes vector measurement based on snapshot polarization-sensitive spectral interferometry, Jul. 10, 2014, Optics Express, vol. 22, No. 14, pp. 1-10.*

Oka, Kazuhiko, and Takayuki Kato. "Spectroscopic polarimetry with a channeled spectrum." Optics Letters 24.21 (1999): 1475-1477.

Kim, Daesuk, et al. "Calibration of a snapshot phase-resolved polarization-sensitive spectral reflectometer." Optics letters 38.22 (2013): 4829-4832.

* cited by examiner

METHOD FOR SNAPSHOT INTERFEROMETRIC SPECTROMETRY

CROSS-REFERENCE TO RELATED APPLICATIONS

This application claims the benefit of U.S. Provisional Application No. 62/217,245, filed Sep. 11, 2015, the entire contents of which is hereby incorporated herein by reference.

BACKGROUND

When interferometric schemes are applied for snapshot spectroscopic polarization-sensitive phase measurement, spectral phase-sensitive phase data for an object can vary substantially based on the three dimensional pose of the object. Therefore, the three dimensional pose of an object can vary as a result of movement or vibration and it results in poor accuracy. In addition, the time required to measure a Stokes vector, such as a normalized spectral Stokes vector, using measured spectroscopic data using traditional systems is limited by the complexity of the measurements and the bandwidth of single wavelength. It is desirable to have a high speed spectroscopic polarimeter that can measure accurate spectral Stokes vectors in real-time using a wide spectral light source without variance based on the three dimensional pose of the object.

DESCRIPTION OF THE DRAWINGS

For a more complete understanding of the embodiments and the advantages thereof, reference is now made to the following description, in conjunction with the accompanying figures briefly described as follows:

FIG. 1 illustrate a snapshot interferometric spectroscopic-polarimetry device according to various example embodiments.

Figure 1A:
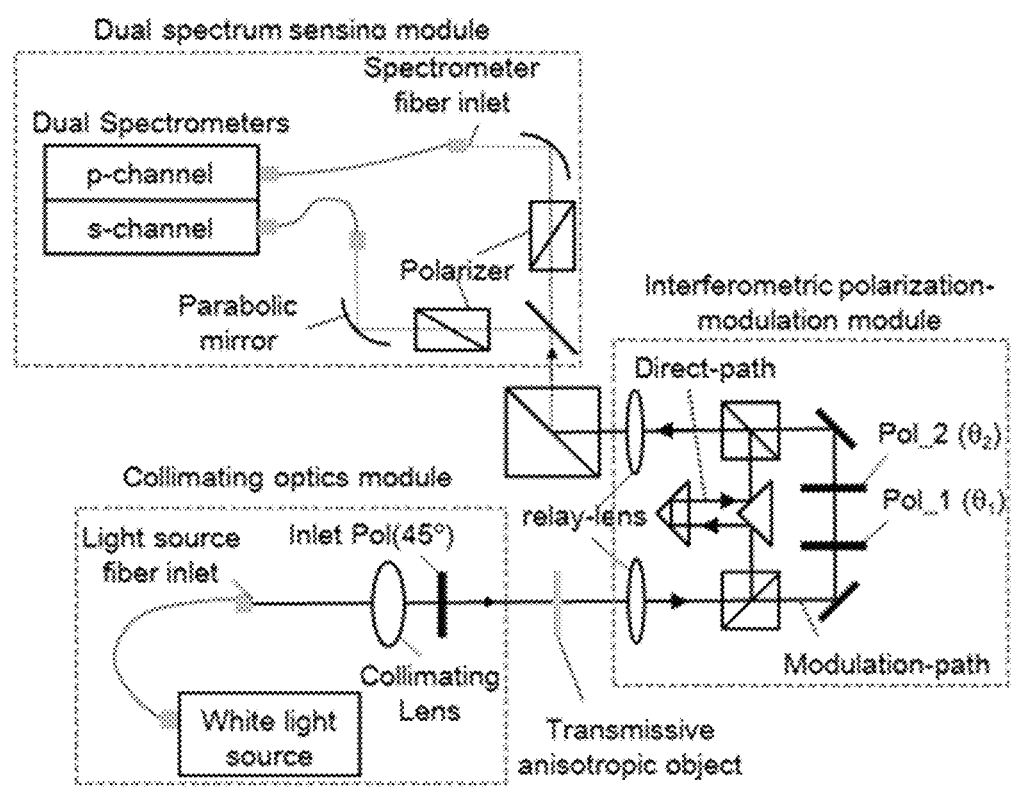
FIG. 1A illustrates a Mach-Zehnder interferometric configuration and FIG. 1B illustrates a Michelson interferometric configuration.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positionings may be exaggerated to help visually convey certain principles. In the drawings, similar reference numerals between figures designate like or corresponding, but not necessarily the same, elements.

DETAILED DESCRIPTION

A snapshot interferometric spectroscopic device ("spectroscopic device"), such as a spectroscopic polarimeter, spectroscopic ellipsometer, or spectroscopic reflectometer, is presented herein according to various embodiments. The snapshot interferometric spectroscopic device can determine an accurate normalized spectral Stokes vector by measuring a snapshot of light in the wide spectral domain in real-time speed. The present disclosure enables the spectroscopic device to extract the spectroscopic Stokes vector of a transmissive anisotropic object in a few milliseconds with high accuracy. In addition, the present disclosure can be used for measuring ellipsometric parameters of reflective objects with thin films or periodic nanopatterns.

The polarization-sensitive spectral interferometric configuration with a common path scheme can enable the spectroscopic device to achieve reliable high robustness with regard to object three dimensional pose variation. The spectroscopic device can measure spectral polarization in a snapshot by utilizing dual spectrum sensing.

Figure 1B:
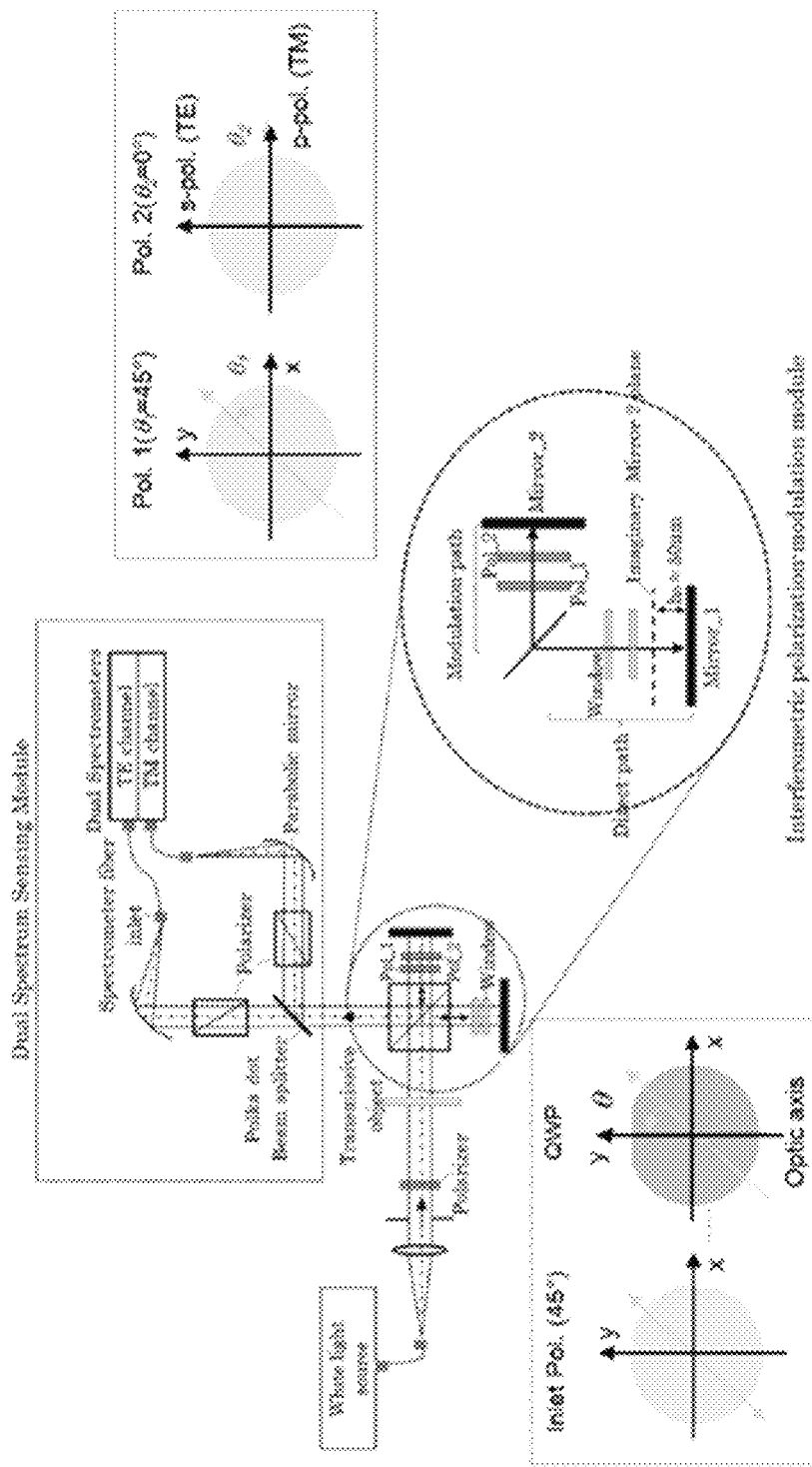

With reference to FIG. 1, shown is a snapshot interferometric spectroscopic device according to various example embodiments. The spectroscopic device can be directed toward polarimetry or ellipsometry. The spectroscopic device can include a beam collimation structure, a polarization modulation structure, and a dual spectrum sensing structure. The spectroscopic device can include one or more computing devices configured to receive data from a dual spectrometer. The one or more computing devices can execute a spectroscopic application to receive and process the data from the dual spectrometer.

According to one embodiment, the beam collimation structure includes a white light source and is configured to generate a collimated light beam. The beam collimation structure includes a collimating lens, a light source fiber inlet, a polarizer, and an iris. The light source fiber inlet is coupled between the white light source and the collimating lens. The light source fiber inlet outputs a light beam positioned to pass through the collimating lens, the polarizer, and the iris. As an example, the light beam first passes through the collimating lens and an output of the collimating lens passes through the polarizer. An output of the polarizer passes through the iris. The polarizer and the iris are positioned parallel to the collimating lens. The light source fiber inlet is configured to provide the light beam directed perpendicularly through the collimating lens, the first polarizer, and the iris to generate the collimated light beam.

The polarization modulation structure can be configured to convert the collimated light beam from the beam collimation structure into a common path light beam. The common path light beam can include a delayed component and a polarized component. In one embodiment, the polarization modulation structure is a Mach-Zehnder interferometer. In another embodiment, the polarization modulation can be performed by using a Michelson interferometric configuration. The polarization modulation structure can include two or more beam splitters, an optical delay structure, and a polarizing structure. A first beam splitter can be positioned to receive the collimated light beam from the beam collimation structure. The first beam splitter can provide a first split light beam to the optical delay structure and a second split light beam to the polarizing structure. The optical delay structure can be configured to convert the first split light beam into a delayed light beam. The polarizing structure can be configured to convert the second light beam into a polarized light beam. The second beam splitter can merge the resulting delayed light beam and the polarized light beam into the common path light beam.

The optical delay structure can be positioned to receive the first split light beam and output the delayed light beam into the second beam splitter. According to one embodiment, the polarizing structure includes two polarizers with one polarizer providing a 90 or 0 degree polarization and another polarizer providing a 45 degree polarization. The polarizing structure can be positioned to receive a split light beam from the first beam splitter. The polarizing structure can output the polarized light beam into the second beam splitter. The second beam splitter can merge the delayed light beam and the polarized light beam to generate a resulting modified light beam, the modified light beam including a delayed light component and a polarized light component.

The dual spectrum sensing structure can be configured to sense a snapshot of the common path light beam on each spectrometer of a dual spectrometer. The dual spectrum sensing structure can include a beam splitter, a first processing structure, a second processing structure, and a dual spectrometer. The beam splitter can be positioned to receive the common path light beam from the optical delay structure. The beam splitter can provide a split light beam to the first processing structure and a split light beam to the second processing structure.

The dual spectrometer can sense one or more snapshots from an output of each of the first processing structure and the second processing structure. The first processing structure can include a polarizer, a parabolic mirror, and a spectrometer fiber inlet coupled to a spectrometer of the dual spectrometer. The second processing structure can also include a polarizer, a parabolic mirror, and a spectrometer fiber inlet coupled to another spectrometer of the dual spectrometer.

According to some embodiments, the snapshot interferometric spectroscopic device comprises no moving parts. The snapshot interferometric spectroscopic device can be stationary, for example, the snapshot interferometric spectroscopic device itself and all parts within the snapshot interferometric spectroscopic device can be stationary during normal operation. Said differently, normal operation of the snapshot interferometric spectroscopic device does not require any moving parts.

According to one embodiment, the snapshot interferometric spectroscopic device measures one or more normalized spectral Stokes vector based in part on polarization properties of a transmissive object. The collimated light beam can exit the beam collimation structure and pass through a transmissive object. Upon passing through the transmissive object, the collimated light beam can pass into the polarization modulation structure. The dual spectrometer measures a snapshot of the resulting light beam to determine spectral intensity data describing properties of the transmissive object.

According to another embodiment, the snapshot interferometric spectroscopic device measures one or more normalized spectral Stokes vector based in part on polarization properties of a thin film object. The collimated light beam can exit the beam collimation structure and reflects off of a thin film object. Upon reflecting off of the thin film object, the collimated light beam can pass into the polarization modulation structure. The dual spectrometer measures a snapshot of the resulting light beam to determine spectral intensity data describing properties of the thin film object.

An object measured by the dual spectrometer can be located outside of the spectroscopic device. The spectroscopic device can include three components; for example, a collimating optics with a broadband light source, an interferometric polarization-modulation module which can be based on either on a Mach-Zehnder interferometric scheme or on a Michelson interferometric scheme, and a perpendicular linearly polarized dual spectrum sensing module. The spectroscopic device can operate successfully with only dual spectral data which can be captured simultaneously by using the dual spectrum sensing module.

A Tungsten-Halogen lamp can be used as the broadband light source and can be connected to the optical fiber inlet through a multimode fiber. After passing through the collimating optics, the illuminating beam can contact the anisotropic object by which the polarization characteristics are to be measured, such as by passing through the anisotropic object or reflecting off of the anisotropic object. Then, according to one embodiment, the illuminating beam can enter the Mach-Zehnder interferometer employing two cube type non-polarizing beam splitters, two reflection plane mirrors, and two linear polarizers.

The interfered wave modulated by the two polarizers can travel to the dual spectrum sensing module. According to one embodiment, the dual spectrum sensing module includes a non-polarizing beam splitter, two perpendicular linearly polarized Glan-Thompson polarizers, two parabolic mirrors, two multimode optical fibers, and two array sensor spectrometers.

Figure 2:
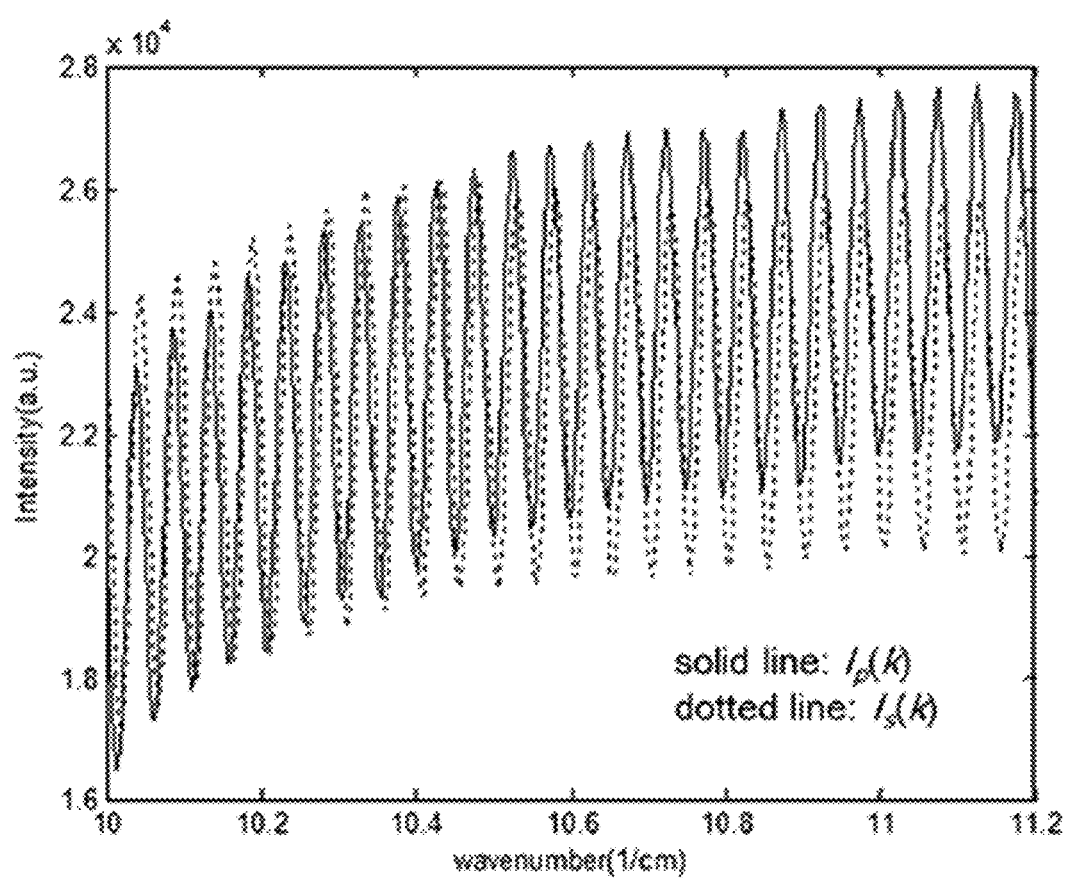
FIG. 2 illustrates an example graph of sensed raw spectral intensity data according to various example embodiments.

With reference to FIG. 2, shown is a graph of sensed raw spectral intensity data obtained during experimentation with the spectroscopic device. The raw spectral intensity data can be acquired by the dual spectrum sensing module. In the example graph, the optical path difference between the two arms of the Mach-Zehnder interferometer equals around 50 μm. The optical path difference can be used to create the high spectral carrier frequency for extracting the spectral complex wave information. The measured spectra by the spectral sensing module can be described as Eq. (1):

$$I_p(k) = (E_D^x + E_M^x)(E_D^x + E_M^x)^*$$

$$I_s(k) = (E_D^y + E_M^y)(E_D^y + E_M^y)^* \quad (1)$$

where, $E_D^x(k)$ and $E_D^y(k)$ denote x and y components of the complex wave $E_D(k)$ represented in Eq. (2) while $E_M^x(k)$ and $E_M^y(k)$ signify the two components of $E_M(k)$.

$$E_D(k) = B_2 B_1 E_{in}(k) e^{ik z_D}$$

$$E_M(k) = B_2 R(-\theta_2) P_2 R(\theta_2) M_2 M_1 R(-\theta_1) P_1 R(\theta_1) B_1 E_{in}(k) e^{ik z_M} \quad (2)$$

Above, k is a wavenumber defined by $2\pi/\lambda$ and $E_D(k)$ represents the complex wave traveling through the direct path where no polarization modulation occurs while $E_M(k)$ denotes that traveling through the modulation path with the two linear polarizers. $B_1$ and $B_2$ correspond to the Jones matrix of the non-polarizing beam splitters used in the Mach-Zehnder interferometer. $M_1$ and $M_2$ denote the Jones matrix of the reflection mirror used in the interferometer. $P_1$ and $P_2$ signify the Jones matrix of the polarizers used in the modulation path. $R(\theta_1)$ and $R(\theta_2)$ mean rotation matrices. $\theta_1$ and $\theta_2$ denote the rotation angle of the polarizer 1 and 2, respectively. $E_{in}(k)$ represents the input wave at the inlet of the interferometer described as in Eq. (3) differently, including when there is no object at the object position, and when a transmissive anisotropic object is placed at the object position as illustrated in FIG. 1A.

$$E_{in}^{no\_object}(k) = \begin{bmatrix} u(k)e^{i\xi(k)} \\ v(k)e^{i\eta(k)} \end{bmatrix}, E_{in}^{object}(k) = \begin{bmatrix} u(k)|t_p|e^{i[\xi(k)+\delta_p(k)]} \\ v(k)|t_s|e^{i[\eta(k)+\delta_s(k)]} \end{bmatrix} \quad (3)$$

Here, $z_D$ and $z_M$ denote the optical path length traveled in the direct and the modulation path, respectively. The optical path difference between $z_D$ and $z_M$ generates the high frequency spectral interference by which the input complex wave vector is extracted. According to one embodiment, the polarizer 1 must be aligned with a rotation angle of $\pi/2$ or 0 in order to make the proposed scheme work normally. Equation (4) represents that both components of the $E_M(k)$ have only the y-component of the input complex wave $E_{in}(k)$ while the $E_D(k)$ have the x- and y-components of the $E_{in}(k)$.

$$E_D(k) = B_2 B_1 E_{in}(k) e^{ikz_D} = \frac{1}{2}\begin{bmatrix} u(k)e^{i[kz_D+\xi(k)]} \\ v(k)e^{i[kz_D+\eta(k)]} \end{bmatrix} \quad (4)$$

$$E_M(k) = B_2 R(-\theta_2) P_2 R(\theta_2) M_2 M_1 R\left(-\frac{\pi}{2}\right) P_1 R\left(\frac{\pi}{2}\right) B_1 E_{in}(k) e^{ikz_M} =$$

$$\frac{1}{2}\begin{bmatrix} \cos^2\theta_2 & \cos\theta_2\sin\theta_2 \\ \cos\theta_2\sin\theta_2 & \sin^2\theta_2 \end{bmatrix} M_2 M_1 \begin{bmatrix} 0 & 0 \\ 0 & 1 \end{bmatrix}\begin{bmatrix} u(k)e^{i[kz_M+\xi(k)]} \\ v(k)e^{i[kz_M+\eta(k)]} \end{bmatrix} =$$

$$\frac{1}{2}\begin{bmatrix} \cos^2\theta_2 & \cos\theta_2\sin\theta_2 \\ \cos\theta_2\sin\theta_2 & \sin^2\theta_2 \end{bmatrix}\begin{bmatrix} 0 \\ r_s^{M_1} r_s^{M_2} v(k)e^{i[kz_M+\eta(k)]} \end{bmatrix} =$$

$$\frac{1}{2}\begin{bmatrix} \cos\theta_2\sin\theta_2 r_s^{M_1} r_s^{M_2} v(k)e^{i[kz_M+\eta(k)]} \\ \sin^2\theta_2 r_s^{M_1} r_s^{M_2} v(k)e^{i[kz_M+\eta(k)]} \end{bmatrix}$$

As a pre-preparation step, we can first attain the spectral coherence functions $\gamma_p(k)$ and $\gamma_s(k)$, which are systematic parameters regardless of the presence of the measured object. For this step, we can capture $|E_D^x(k)|$, $|E_M^x(k)|$, $|E_D^y(k)|$ and $|E_M^y(k)|$ as well as the dual spectral interference data $I_p^{no\_object}(k)$ and $I_s^{no\_object}(k)$ described as in Eq. (5).

$$I_p^{no\_object}(k) = (E_D^x + E_M^x)(E_D^x + E_M^x)^* = |E_D^x|^2 + |E_M^x|^2 + 2\gamma_p|E_D^x||E_M^x|\cos\{kz_0 + [\xi(k)-\eta(k)] + \phi_p(k)\}$$

$$I_s^{no\_object}(k) = (E_D^y + E_M^y)(E_D^y + E_M^y)^* = |E_D^y|^2 + |E_M^y|^2 + 2\gamma_s|E_D^y||E_M^y|\cos[kz_0 + \phi_s(k)] \quad (5)$$

Here, $z_0$ can denote the optical path difference, such as $z_D - z_M$. The interfered spectra can be modified by subtracting $|E_D^x(k)|^2$ and $|E_M^x(k)|^2$ from the $I_p^{no\_object}(k)$ and then dividing it by $2|E_D^x(k)||E_M^x(k)|$. The spectral coherence function $\gamma_p(k)$ and the spectral phase function $\Phi_p^{no\_object}(k) = k(z_D - z_M) + [\xi(k)-\eta(k)] + \phi_p(k)$ can be extracted by using the Fourier transform method applied in the spectral domain, which can be enabled because of the modified spectra. Likewise, $\gamma_s(k)$ and $\Phi_s^{no\_object}(k) = k(z_D - z_M) + \phi_s(k)$ can be calculated, separately.

Once the spectral coherent functions and spectral phase functions for the no-object configuration are achieved, we are ready to measure the normalized spectral Stokes vector of a transmissive anisotropic object by using the proposed snapshot scheme. Subsequently, we place an anisotropic object as illustrated in FIG. 1A and measure the interfered dual-spectra as depicted in FIG. 2. Equation (6) describes the measured dual-spectra derived by replacing the input wave $E_{in}(k)$ in Eq. (2) with $E_{in}^{object}(k)$ denoted in Eq. (3).

$$I_p^{object}(k) = |E_D^x|^2 + |E_M^x|^2 + 2\gamma_p|E_D^x||E_M^x|\cos\{(\Phi_p^{object}(k) = A_p^{DC} + 2\gamma_p A_p^{AC}\cos\{kz_0 + [\xi(k)-\eta(k)] + [(\delta_p(k) - \delta_s(k)] + \phi_p(k)\}$$

$$I_s^{object}(k) = |E_D^y|^2 + |E_M^y|^2 + 2\gamma_s|E_D^y||E_M^y|\cos[\Phi_s^{object}(k)] = A_s^{DC} + 2\gamma_s A_s^{AC}\cos[kz_0 + \phi_s(k)] \quad (6)$$

Here, new spectral variables can be defined: $A_p^{DC} = |E_D^x|^2 + |E_M^x|^2$ and $A_p^{AC} = |E_D^x||E_M^x|$. Likewise, $A_s^{DC} = |E_D^y|^2 + |E_M^y|^2$ and $A_s^{AC} = |E_D^y||E_M^y|$. $|E_D^x|$ and $|E_D^y|$ can be extracted by obtaining those four spectral variables $A_p^{DC}$, $A_p^{AC}$, $A_s^{DC}$ and $A_s^{AC}$. Since the spectral coherence functions $\gamma_p$ and $\gamma_s$ of the system can be regarded as fixed spectral functions, and also we can measure the four spectral variables by using Fourier transform method, we can extract $|E_D^x(k)| = u(k)|t_p(k)|$ and $|E_D^y(k)| = v(k)|t_s(k)|$. Here, the ratio between $u(k)$ and $v(k)$ is known. Eventually, the polarimetric parameter $\Psi_a(k)$ and the phase difference $\Delta_a(k)$ between the p- and s-polarization created by the anisotropic object of the transmissive anisotropic object is attained by using Eq. (7).

$$\Psi_a(k) = \tan^{-1}\left[\frac{t_p(k)}{t_s(k)}\right] = \tan^{-1}\left[\left(\frac{|E_D^x(k)|}{|E_D^y(k)|}\right)\left(\frac{v(k)}{u(k)}\right)\right] \quad (7)$$

$$\Delta_a(k) = \delta_p(k) - \delta_s(k) =$$
$$[\Phi_p^{object}(k) - \Phi_s^{object}(k)] - [\Phi_p^{no\_object}(k) - \Phi_s^{no\_object}(k)]$$

Once the calibrated $\Psi_a(k)$ and $\Delta_a(k)$ of the anisotropic object quarter-wave plate (QWP) are measured, the normalized Stokes vectors can be calculated directly by using Eq. (8).

$$S_1(k) = -\cos[2\Psi_a(k)]$$

$$S_2(k) = \sin[2\Psi_a(k)]\cos[\Delta_a(k)]$$

$$S_3(k) = -\sin[2\Psi_a(k)]\sin[\Delta_a(k)] \quad (8)$$

Figure 3:
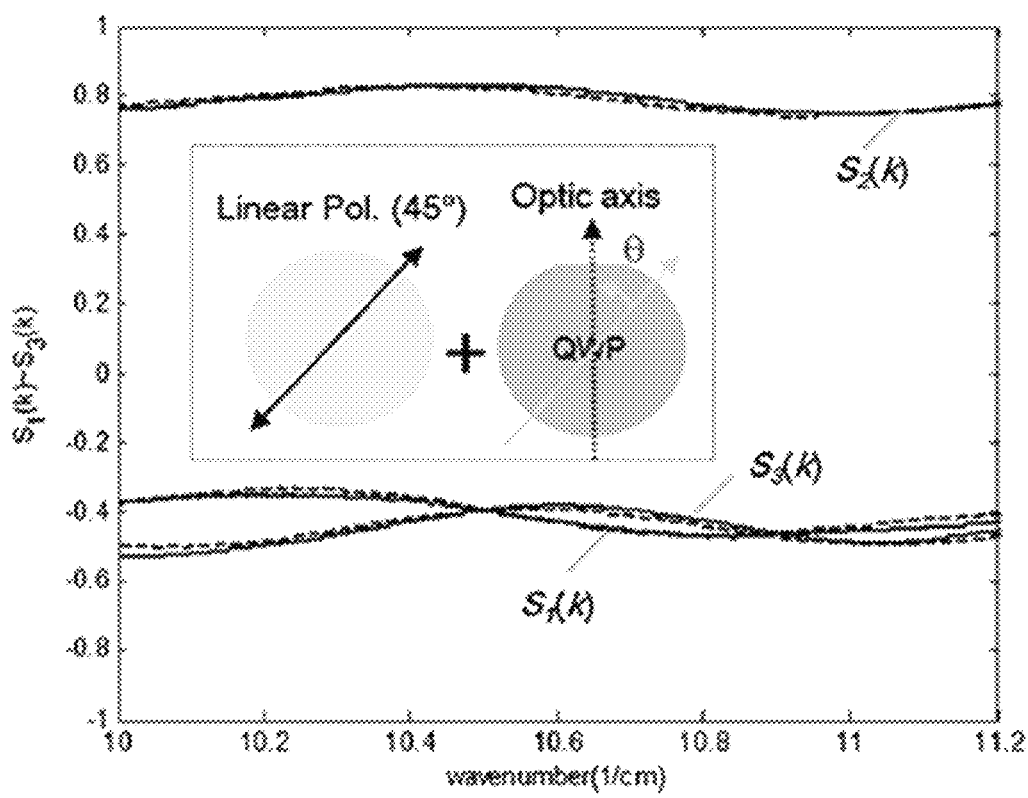
FIG. 3 illustrates an example graph of various normalized Stokes parameters according to various example embodiments.

With reference to FIG. 3, illustrated is an example graph of the normalized spectral Stokes vector for a certain QWP rotation angle. A comparison with the Stokes vector of the same QWP measured by commercialized equipment is illustrated. The illustration shows the method can provide highly accurate measurement capability.

Figure 4:
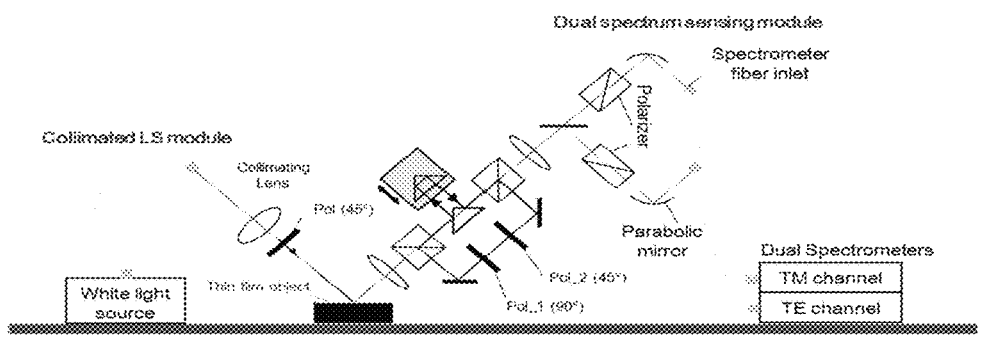
FIG. 4 illustrates a snapshot interferometric spectroscopic ellipsometry device according to various example embodiments.

With reference to FIG. 4, shown is a snapshot interferometric spectroscopic ellipsometry device according to various example embodiments. The schematic block diagram of the example snapshot interferometric spectroscopic ellipsometry can include the same modules used for the interferometric spectro-polarimeter illustrated in FIG. 1A. The snapshot interferometric spectro-ellipsometer can include a broadband light source, reflective measured object, Mach-Zehnder interferometer including the polarization modulation part, and a perpendicular linearly polarized dual spectrum sensing module. The same schematics of the polarization modulation interferometer and dual spectrum sensing modules can be used for spectroscopic ellipsometric parameters measurement of reflective objects with thin films or periodic nano patterns. For periodic nano pattern measurement, normal incidence configuration can be used.

Figure 5A:
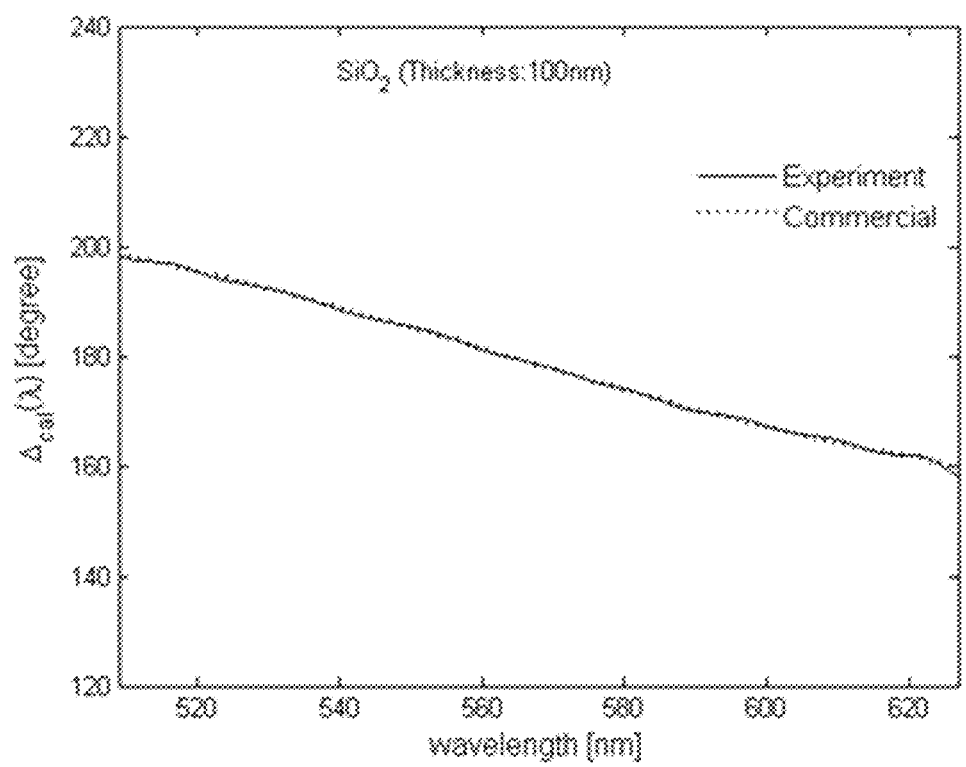
FIGS. 5A-5B illustrate example graphs of two thin film objects according to various example embodiments.
Figure 5B:
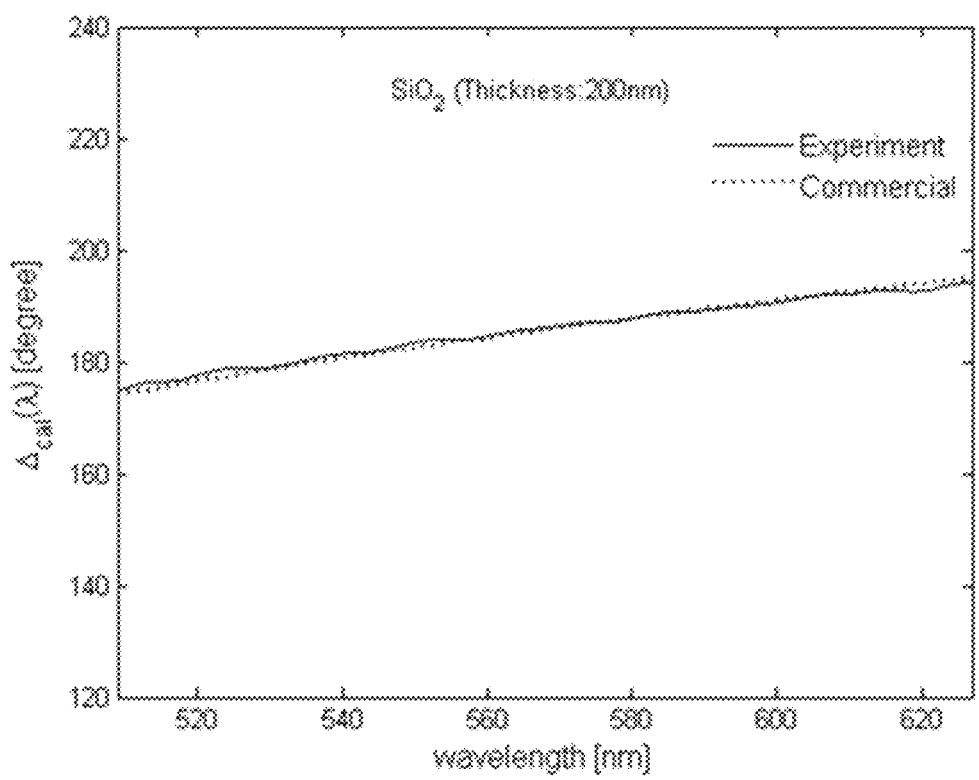

Two thin film measurement results are shown in FIGS. 5A-5B. In order to check the feasibility, two thin film objects with 100 nm and 200 nm SiO2 film deposited on a Si wafer were measured. The solid lines indicate what was measured by using the snapshot interferometric spectro-ellipsometer and the dotted lines represent the spectroscopic ellipsometric parameters obtained by using a commercialized spectroscopic ellipsometer. The snapshot interferometric spectro-ellipsometer can obtain the spectroscopic ellipsometric parameters $\Psi(k)$ and $\Delta(k)$ in a few msec and thus can monitor those parameters in real time speed.

Figure 6:
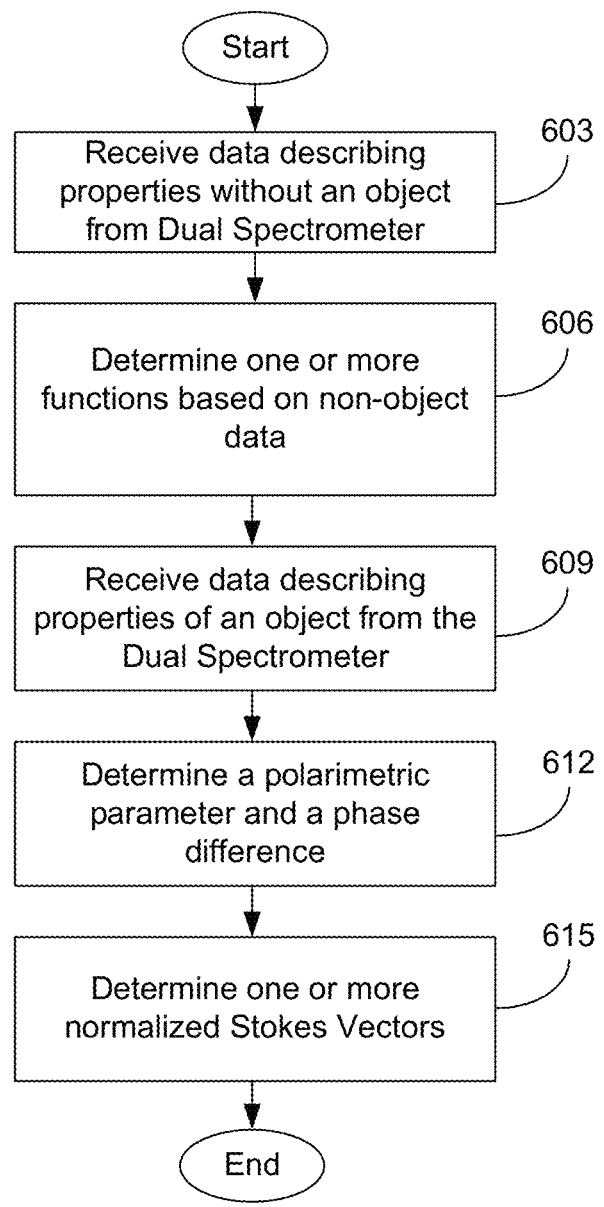
FIG. 6 is a flowchart illustrating one example of functionality implemented as portions of a spectroscopic application executed in a computing environment of FIG. 7 according to various embodiments of the present disclosure.

Referring next to FIG. 6, shown is a flowchart that provides one example of the operation of a portion of the spectroscopic application 753 (FIG. 7) according to various embodiments. It is understood that the flowchart of FIG. 6 provides merely an example of the many different types of functional arrangements that may be employed to implement the operation of the portion of the spectroscopic application 753 as described herein. As an alternative, the flowchart of FIG. 6 can be viewed as depicting an example of elements of a method implemented in the computing device 700 (FIG. 7) according to one or more embodiments.

Beginning with box 603, the spectroscopic application 753 receives data describing properties of a spectroscopic device without an object located between a beam collimation structure and a polarization modulation structure. A beam collimation structure can collimate a light source to generate a collimated light beam. A polarization modulation structure can receive the collimated light beam without the collimated light beam contacting an object. The polarization modulation structure can generate a common path light beam including a delayed component and a polarized component.

A dual spectrum sensing structure can receive the common path light beam and capture a snapshot of the common path light beam in a dual spectrometer from each of a first spectrum sensing structure and a second spectrum sensing structure of a dual spectrum sensing structure. The spectroscopic application 753 can receive the snapshots from the dual spectrometer, the snapshots including data describing properties of the common path light beam without an object.

At box 606, the spectroscopic application 753 determines one or more functions based on the data describing properties of the non-object data. The spectroscopic application 753 can determine one or more spectral coherence functions and one or more spectral phase functions based in part on the data describing properties of the non-object data from the snapshots. According to one embodiment, the spectral coherence functions and the spectral phase functions describe properties of the spectroscopic device when no object is present.

At box 609, the spectroscopic application 753 receives data describing properties of an object from the dual spectrometer. A beam collimation structure can collimate a light source to generate a collimated light beam. A polarization modulation structure can receive the collimated light beam having contacted an object. The polarization modulation structure can generate a common path light beam including a delayed component and a polarized component.

The dual spectrum sensing structure can receive the common path light beam and capture a snapshot of the common path light beam in a dual spectrometer from each of a first spectrum sensing structure and a second spectrum sensing structure of a dual spectrum sensing structure. The spectroscopic application 753 can receive the snapshots from the dual spectrometer, the snapshots including data describing properties of the object. In some embodiments, the object is a transmissive anisotropic object and the collimated light beam contacts the object by passing through the object. In other embodiments, the object is one or more thin films and the collimated light beam contacts the object by reflecting off of the object.

At box 612, the spectroscopic application 753 determines a polarimetric parameter and a phase difference. The polarimetric parameter and the phase difference can be determined based in part on a p-polarization and an s-polarization measured by the dual spectrometer. According to one embodiment, the polarimetric parameter and the phase difference is calculated using Eq. 7 discussed herein.

At box 515, the spectroscopic application 753 determines one or more normalized Stokes vectors. The normalized Stokes vectors are determined based in part on the data from the snapshots when an object is omitted and the data from the snapshots when the object is present. According to one embodiment, the spectroscopic application 753 generates normalized spectral Stokes vectors. The normalized spectral Stokes vector can be based in part on the one or more spectral coherence functions and one or more spectral phase functions. The normalized spectral Stokes vector can also be based in part on the polarimetric parameter and the phase difference. According to one embodiment, the normalized Stokes vectors are calculated using Eq. 8 discussed herein.

Figure 7:
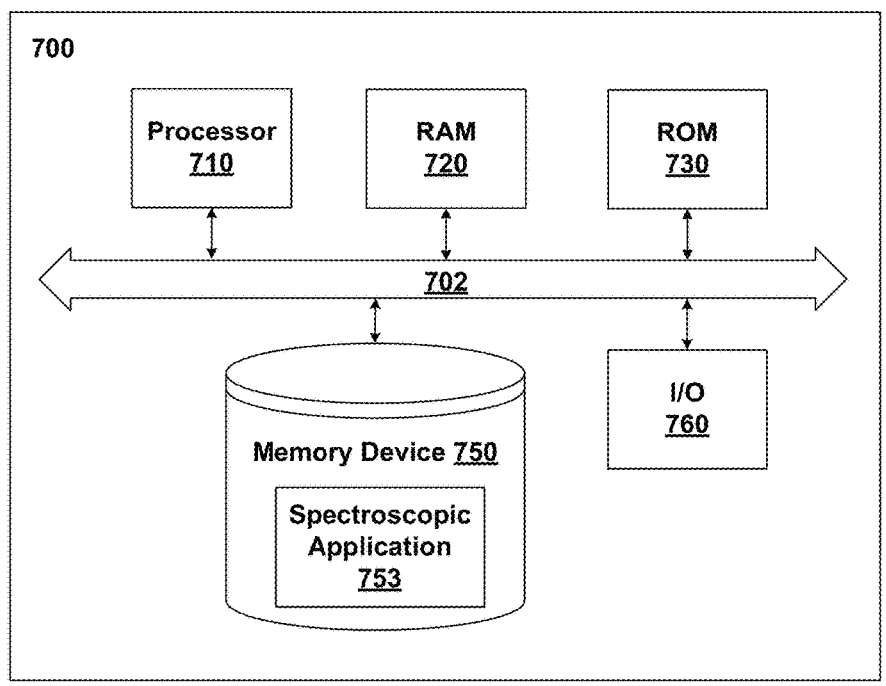
FIG. 7 illustrates an example schematic block diagram of a computing environment which can embody one or more of the system according to various embodiments.

With reference to FIG. 7, shown is a schematic block diagram of the computing device 700 according to an embodiment of the present disclosure. The computing device 700 includes at least one processor circuit, for example, having a processor 710 and a memory 750, both of which are coupled to a local interface 702. To this end, computing device 700 may comprise, for example, at least one server computer or like device. The local interface 702 may comprise, for example, a data bus with an accompanying address/control bus or other bus structure as can be appreciated.

Stored in the memory 750 are both data and several components that are executable by the processor 710. In particular, stored in the memory 750 and executable by the processor 710 is spectroscopic application 753, and potentially other applications. In addition, an operating system may be stored in the memory 750 and executable by the processor 710.

It is understood that there may be other applications that are stored in the memory 750 and are executable by the processor 710 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 750 and are executable by the processor 710. In this respect, the term "executable" means a program file that is in a form that can ultimately be run by the processor 710. Examples of executable programs may be, for example, a compiled program that can be translated into machine code in a format that can be loaded into a random access portion of the memory 750 and run by the processor 710, source code that may be expressed in proper format such as object code that is capable of being loaded into a random access portion of the memory 750 and executed by the processor 710, or source code that may be interpreted by another executable program to generate instructions in a random access portion of the memory 750 to be executed by the processor 710, etc. An executable program may be stored in any portion or component of the memory 750 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 750 is defined herein as including both volatile and nonvolatile memory and data storage components. Volatile components are those that do not retain data values upon loss of power. Nonvolatile components are those that retain data upon a loss of power. Thus, the memory 750 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 710 may represent multiple processors 710 and/or multiple processor cores and the memory 750 may represent multiple memories 750 that operate in parallel processing circuits, respectively. In such a case, the local interface 702 may be an appropriate network that facilitates communication between any two of the multiple processors 710, between any processor 710 and any of the memories 750, or between any two of the memories 750, etc. The local interface 702 may comprise additional systems designed to coordinate this communication, including, for example, performing load balancing. The processor 710 may be of electrical or of some other available construction.

Although spectroscopic application 753, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the spectroscopic application 753. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 710 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including spectroscopic application 753, that comprises software or code can be embodied in any non-transitory computer-readable medium for use by or in connection with an instruction execution system such as, for example, a processor 710 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including spectroscopic application 753, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, at least the following is claimed:

1. A method for measuring spectral stokes vector of an object comprising:
   collimating a light emitted from a white light source in a beam collimation structure to generate a collimated light beam;
   receiving the collimated light beam in a polarization modulation structure, the collimated light beam having contacted an object;
   generating, via the polarization modulation structure, a common path light beam comprising a delayed component and a polarized component;
   receiving the common path light beam in a dual spectrum sensing structure; and
   capturing snapshots from an output of each of a first processing structure and a second processing structure in a dual spectrometer,
   wherein the polarization modulation structure comprises a first beam splitter, an optical delay structure, a polarizing structure, and a second beam splitter,
   wherein the first beam splitter and the second beam splitter are non-polarizing splitters;
   wherein the dual spectrum sensing structure comprises a beam splitter, the first processing structure, the second processing structure, and a dual spectrometer, and
   wherein the first processing structure comprises a first polarizer, a first parabolic mirror, and a first spectrometer fiber inlet coupled to the dual spectrometer, and the second processing structure comprises a second polarizer, a second parabolic mirror, and a second spectrometer fiber inlet coupled to the dual spectrometer.

2. The method of claim 1, wherein the object is a transmissive anisotropic object and the collimated light beam contacts the object by passing through the object.

3. The method of claim 1, wherein the object is at least one thin film and the collimated light beam contacts the object by reflecting off of the object.

4. The method of claim 1, wherein the object is periodic nano pattern structure and the collimated light beam contacts the object by reflecting off of the object with normal incidence configuration.

5. The method of claim 1, further comprising:
   collimating the light emitted from the white light source in the beam collimation structure to generate a second collimated light beam;
   receiving the second collimated light beam in the polarization modulation structure without contacting the object;
   generating, via the polarization modulation structure, a second common path light beam comprising a second delayed component and a second polarized component;
   receiving the second common path light beam in the dual spectrum sensing structure; and
   capturing snapshots from the output of each of the first processing structure and the second processing structure in a dual spectrometer.

6. The method of claim 5, further comprising determining at least one spectral coherence function and at least one spectral phase function based at least in part on the third snapshot and the fourth snapshot.

7. The method of claim 6, further comprising measuring a normalized spectral Stokes vector of the object based at least in part on the at least one spectral coherence function and the at least one spectral phase function.

8. The method of claim 1, further comprising determining at least one normalized Stokes vector based at least in part on the first snapshot and the second snapshot by determining a polarimetric parameter and a phase difference between the first snapshot and the second snapshot.

* * * * *